(12) United States Patent
Hazarkhanov et al.

(10) Patent No.: US 10,190,878 B2
(45) Date of Patent: Jan. 29, 2019

(54) UNIVERSAL LIQUID ANGLE INDICATOR

(71) Applicant: NATIONAL AVIATION ACADEMY, Baku (AZ)

(72) Inventors: Anvar Tapdiq Hazarkhanov, Baku (AZ); Toghrul Isa Karimli, Baku (AZ); Aftandil Abil Abdullabayli, Baku (AZ)

(*) Notice: Subject to any disclaimer, the term of this patent is extended or adjusted under 35 U.S.C. 154(b) by 88 days.

(21) Appl. No.: 15/533,586

(22) PCT Filed: Dec. 15, 2015

(86) PCT No.: PCT/AZ2015/000007
§ 371 (c)(1),
(2) Date: Jun. 6, 2017

(87) PCT Pub. No.: WO2016/154687
PCT Pub. Date: Oct. 6, 2016

(65) Prior Publication Data
US 2017/0370717 A1 Dec. 28, 2017

(30) Foreign Application Priority Data

Dec. 19, 2014 (EA) .................................. 201500349

(51) Int. Cl.
*G01C 9/36* (2006.01)
*G01C 9/34* (2006.01)
(Continued)

(52) U.S. Cl.
CPC ................ *G01C 9/34* (2013.01); *B64C 11/02* (2013.01); *G01C 1/00* (2013.01); *G01C 9/28* (2013.01); *G01C 9/36* (2013.01)

(58) Field of Classification Search
CPC ..................................... G01C 9/34; G01C 9/36
(Continued)

(56) References Cited

U.S. PATENT DOCUMENTS

| 1,855,651 A | 4/1932 | Robertson |
| 2,211,201 A * | 8/1940 | Fell .......................... G01C 9/30 33/380 |

(Continued)

FOREIGN PATENT DOCUMENTS

| RU | 2312307 | 12/2007 |
| RU | 2512651 C2 | 4/2014 |

(Continued)

*Primary Examiner* — G. Bradley Bennett
(74) *Attorney, Agent, or Firm* — John Alumit (57) ABSTRACT

The invention is related to gages to measure incline angles of moving and immobile objects and can be used in incline angle gages in such transportation vehicles as airplanes and ships (if a phosphorus scale can be applied to a closed loop clear tube) as a standby device to display pitch and roll angles (FIG. 5, FIG. 6, FIG. 7, FIG. 8). The purpose of this invention is an effective measurement of incline angles in stationary and dynamic objects in a wide range (0°-180°, 0°-360°). Faster measurement is required to improve stated parameters of the general purpose liquid angle indicator. It is achieved because liquid, an air bubble or indicating ball within the semicircular and round clear tube, subjected to gravitational forces, can display measured angles relative to the scale on the graduated clear tube without being in a horizontal position.

8 Claims, 8 Drawing Sheets

(51) Int. Cl.
   *B64C 11/02* (2006.01)
   *G01C 1/00* (2006.01)
   *G01C 9/28* (2006.01)

(58) Field of Classification Search
   USPC .................................. 33/377, 379, 381, 390
   See application file for complete search history.

(56) References Cited

U.S. PATENT DOCUMENTS

| | | | | |
|---|---|---|---|---|
| 3,673,697 A | * | 7/1972 | Wasson | G01C 9/32 |
| | | | | 33/348 |
| 3,832,782 A | * | 9/1974 | Johnson | G01C 9/28 |
| | | | | 33/351 |
| 5,079,847 A | * | 1/1992 | Swartz | G01C 9/20 |
| | | | | 33/366.12 |
| 5,272,816 A | * | 12/1993 | Fujiwara | G01C 9/24 |
| | | | | 33/379 |
| 6,568,092 B1 | | 5/2003 | Ward | |
| 6,779,276 B1 | * | 8/2004 | Turner | G01C 9/32 |
| | | | | 33/351 |
| 7,370,428 B2 | * | 5/2008 | Decker, Jr. | G01C 9/06 |
| | | | | 33/366.11 |
| 2003/0181919 A1 | * | 9/2003 | Gorek | A61B 17/1757 |
| | | | | 606/96 |
| 2009/0158605 A1 | * | 6/2009 | Montgomery | G01C 9/26 |
| | | | | 33/379 |
| 2012/0266470 A1 | * | 10/2012 | Ekchian | G01C 9/20 |
| | | | | 33/377 |
| 2015/0101203 A1 | * | 4/2015 | Ligh | G01C 9/24 |
| | | | | 33/379 |
| 2017/0003125 A1 | * | 1/2017 | Chi | G01C 9/34 |
| 2017/0292837 A1 | * | 10/2017 | Jones | G01C 9/28 |

FOREIGN PATENT DOCUMENTS

| | | |
|---|---|---|
| SU | 901818 A2 | 1/1982 |
| SU | 1157352 A1 | 5/1985 |

* cited by examiner

UNIVERSAL LIQUID ANGLE INDICATOR

CROSS-REFERENCE TO RELATED APPLICATION

This application claims priority to PCT application no. PCT/AZ2015/000007 filed on Dec. 15, 2015. The earliest priority filing date claimed is Dec. 19, 2014.

FEDERALLY SPONSORED RESEARCH

Not Applicable

SEQUENCE LISTING OR PROGRAM

Not Applicable

The claimed invention "General Purpose Angle Indicator" is related to informational-measuring technology and may be used to control and measure incline angles of surfaces of mobile or immobile objects, transportation vehicles, including aircrafts and ships as a standby attitude indicator, which does not require any electric power.

To determine pitch and roll angles of an aircraft with the help of an attitude gyroscope, it is required that rotor rotational axis is directed along the vertical of the place. The gyroscope's own rotational axis is placed into a vertical position by the gravity monitoring system based on the signals from liquid pendulous sensors [1]. When the gyroscope's main axis deviates from the horizon plane, an air bubble in liquid pendulous sensors is displaced relative to electrodes and changes an electrolyte surface contact area with platinum electrodes. As a result, currents, different in values and directions, flow along control windings of the corrective motor. The motor will create a momentum relative to the external frame suspension, and the gyroscope will start to precess relative to the gyro unit suspension axis. A horizontal correction works in such a way, so the corrective motor guides the gyroscope precession toward a direction, where the displacement angle of the main axis and surface is reduced [2]. The lateral correction circuit has a contact, which breaks the circuit when an airplane makes a turn, thus reducing a turn's margin of error. Features that are present in the claimed invention are italicized.

A deficiency of the known device is its complex and expensive design, as well as its purpose for only a certain correction task.

There is a known carpenter's bubble level [3]. The device consists of the housing, two or three clear tubes, filled with liquid, containing a small amount of air. Features that are present in the claimed invention are italicized.

A deficiency of the known device is its limited number of measured angles 0° and 90°, which depend on the number of clear bubble tubes.

There is a "carpenter's level", which contains a semi-concave hemisphere (vessel), made of clear plastic [4]. The inner surface of the hemisphere has concentric circle marks, corresponding to incline angles 30°, 45° and 90° and two lines at 90° angle relative to each other. A liquid and ball made of nonmagnetic material are inside the clear semi-concave vessel. The hemisphere is fastened to the L-shaped base. Features that are present in the claimed invention are italicized.

A deficiency of the known device is its limited number of measured angles 0°, 30°, 45° and 60°.

There is a device (prototype), most technically similar the claimed device, which measures the following angle ranges: 0°-90° and 0°-360° [5]. The device consists of an immobile base with a scale, a movable base, to which a clear tube with liquid and air bubble (ampoule) is fastened. To measure angles, the movable base with the ampoule is turned until the air bubble reaches a horizontal position. Furthermore, the position of the movable base relative to the scale will show the measured angle. Features that are present in the claimed invention are italicized.

A deficiency of the known device is putting the movable base into horizontal position for every measurement. A usage of this device cannot be applicable when frequently measuring angles of dynamic objects.

The task of the invention is to eliminate wasted time when measuring incline angles of stationary and dynamic objects in a wide range (0°-180°, 0°-360°), without requiring electric power.

The technical result is achieved when measuring incline angles, a liquid, air bubble or an indicating ball, located in the cavity of a semicircular or round clear tube, without placing it in the horizontal position due to force of gravity, the measured angles are directly shown relative to the scale, marked on the clear tube.

The general purpose liquid angle indicator consists of a semicircular or round clear tube 1, with liquid 2, air bubble 3 or indicating ball 4 located in its cavity. Submitted drawings (FIG. 1-8) are placed on the measured object by its base.

Submitted drawings (FIG. 1-2) consist of bases and semicircular clear tubes with an open contour, attached to them, designed to measure 0°-180° angle range.

The device (FIG. 3) measures 0°-180° angle range and device (FIG. 4) measures 0°-360° angle range, where indicators are physical pendulums (balls), moving relative to scales marked on clear semicircular tubes.

Figure 7:
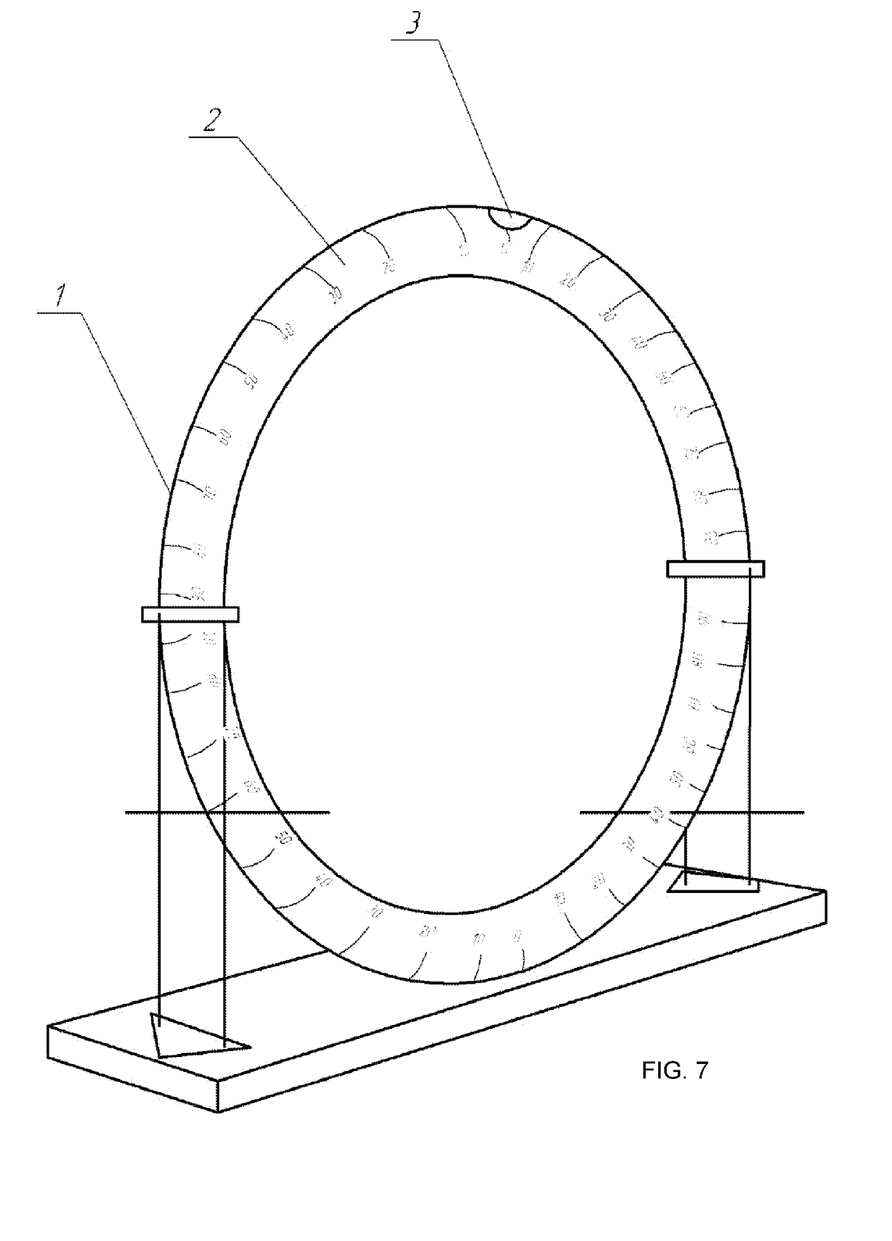
Figure 8:
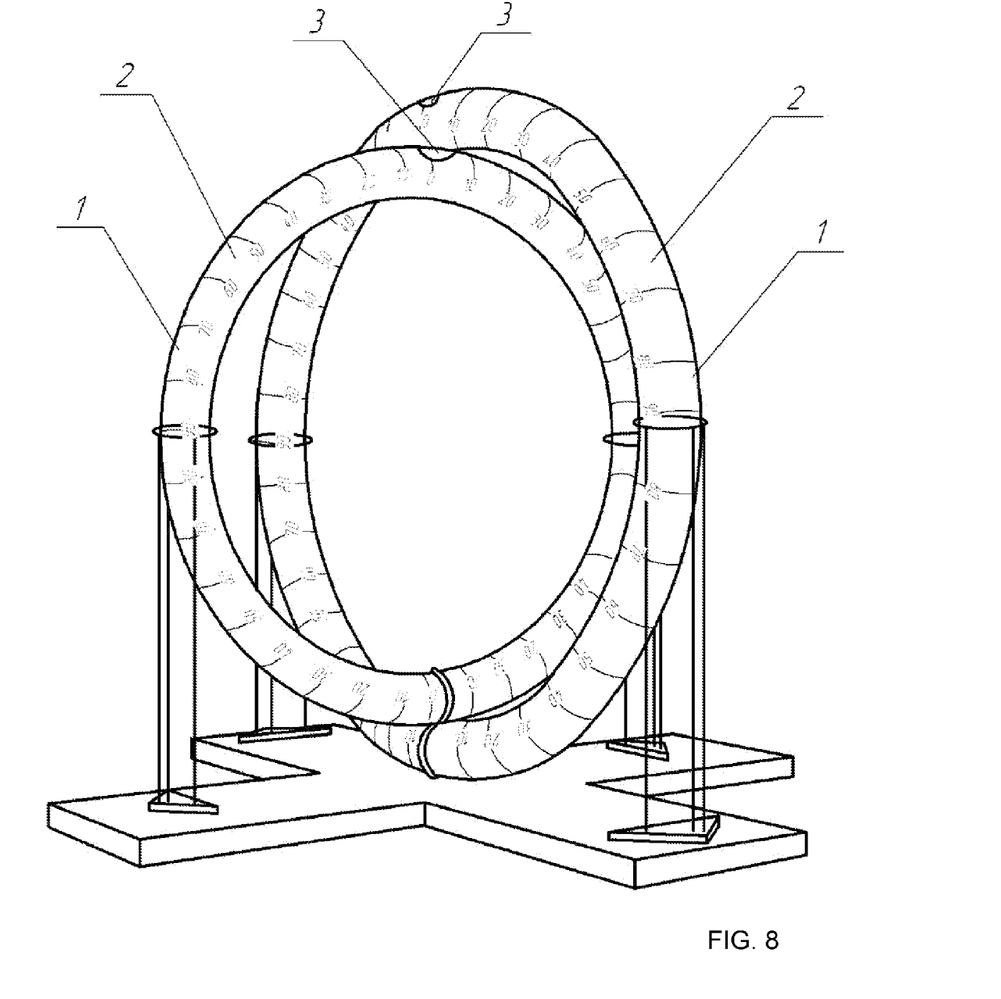

Devices (FIG. 5-6) measure 0°-180° angle range, devices (FIG. 7-8) measure 0°-360° angle range relative to X or Y axis (FIG. 7), or relative to X and Y axis (FIG. 8). Semicircular or round closed loop clear tubes lead to a reduction in parasitic inertia forces impacting a liquid when measuring angles in dynamic objects. At relatively small accelerations of dynamic objects, a mutual compensation of inertia forces (inertia forces, directed clockwise and counterclockwise, are mutually compensated) allows to use these devices (FIG. 5-8) as standby non-electric devices (with phosphoric scales) to measure pitch and roll angles in aviation and naval navigation.

REFERENCES

1. S. M. Fedorov, O. I. Mikhailov, N. N. Sukhikh. On-board information-management systems. Moscow, 1994.
2. V. G. Vorobyev, V. V. Glukhov, V. V. Kadyshev. Avionic information-management system and unit devices. Moscow, 1992.
3. http://geobiz.ru/level.
4. Patent: RU 2312307. Carpenter's level. Alexander Vasilyevich Plotnikov. Oct. 12, 2007. Issue No. 34.
5. http://tesatools.by. model No. 05331700.

Figure 1:
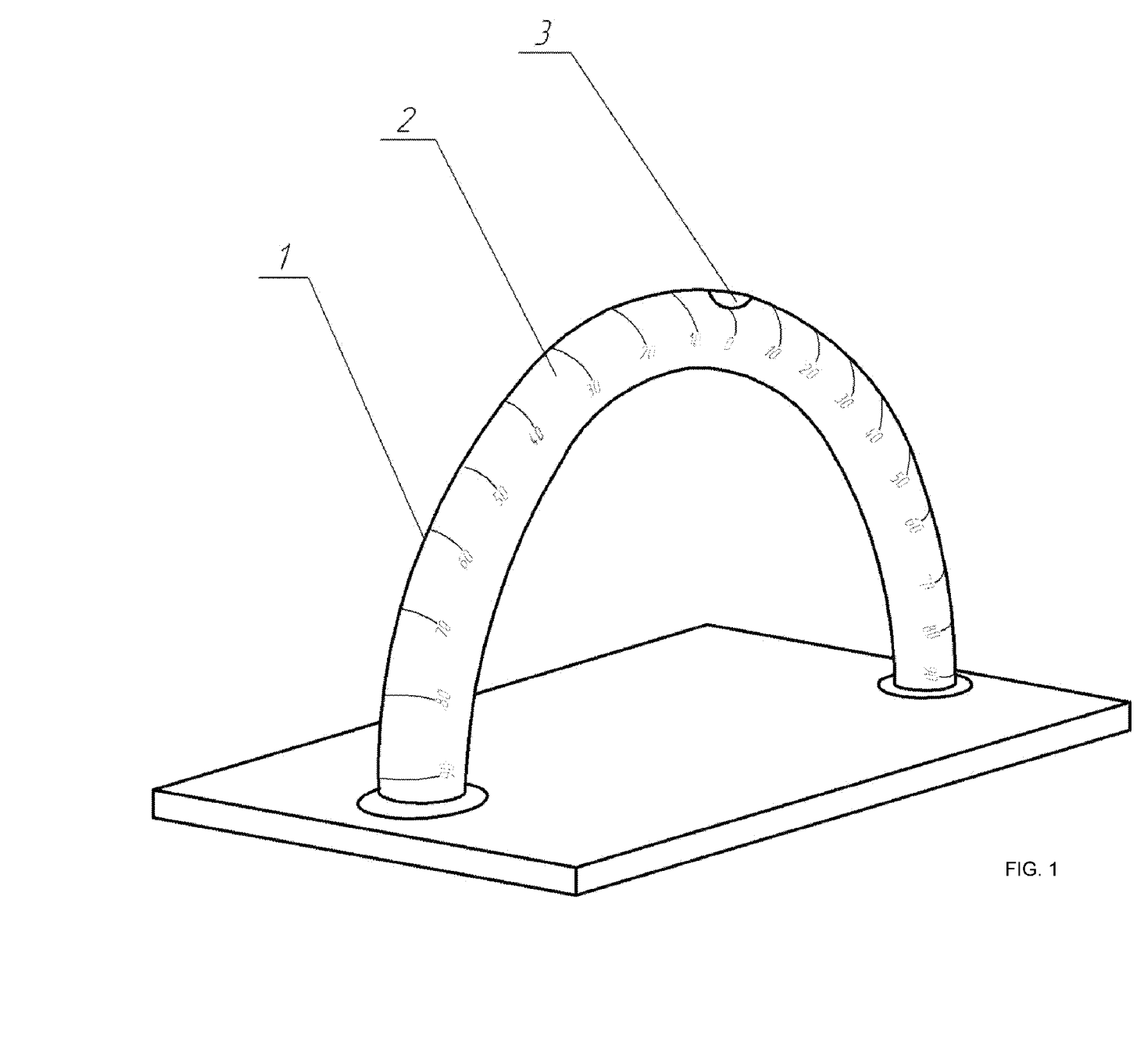

The invention claimed is:

1. A liquid angle indicator, consisting of the base with a graduated glass tube attached to it, which contains liquid and an indicator, i.e. an air bubble, differing by having an open loop semicircular glass tube, its ends are attached to the rectangular plate (base). (FIG. 1).

Figure 2:
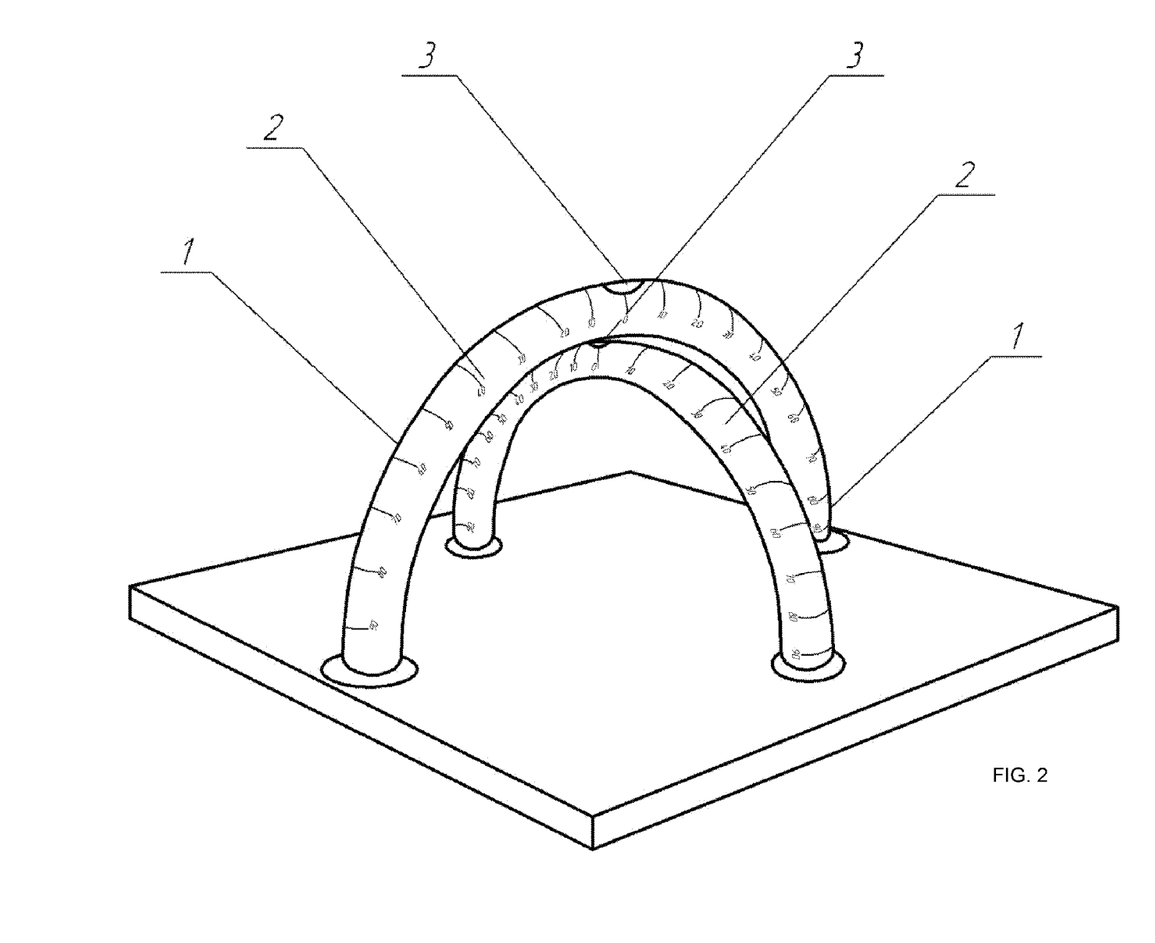

2. A liquid angle indicator, consisting of the base with a graduated glass tube attached to it, which contains liquid and an indicator, i.e. an air bubble, differing by having a second glass tube, where both open loop glass tubes are semicircular with one tube crossing another and their ends are attached to the rectangular plate (base). (FIG. 2).

Figure 3:
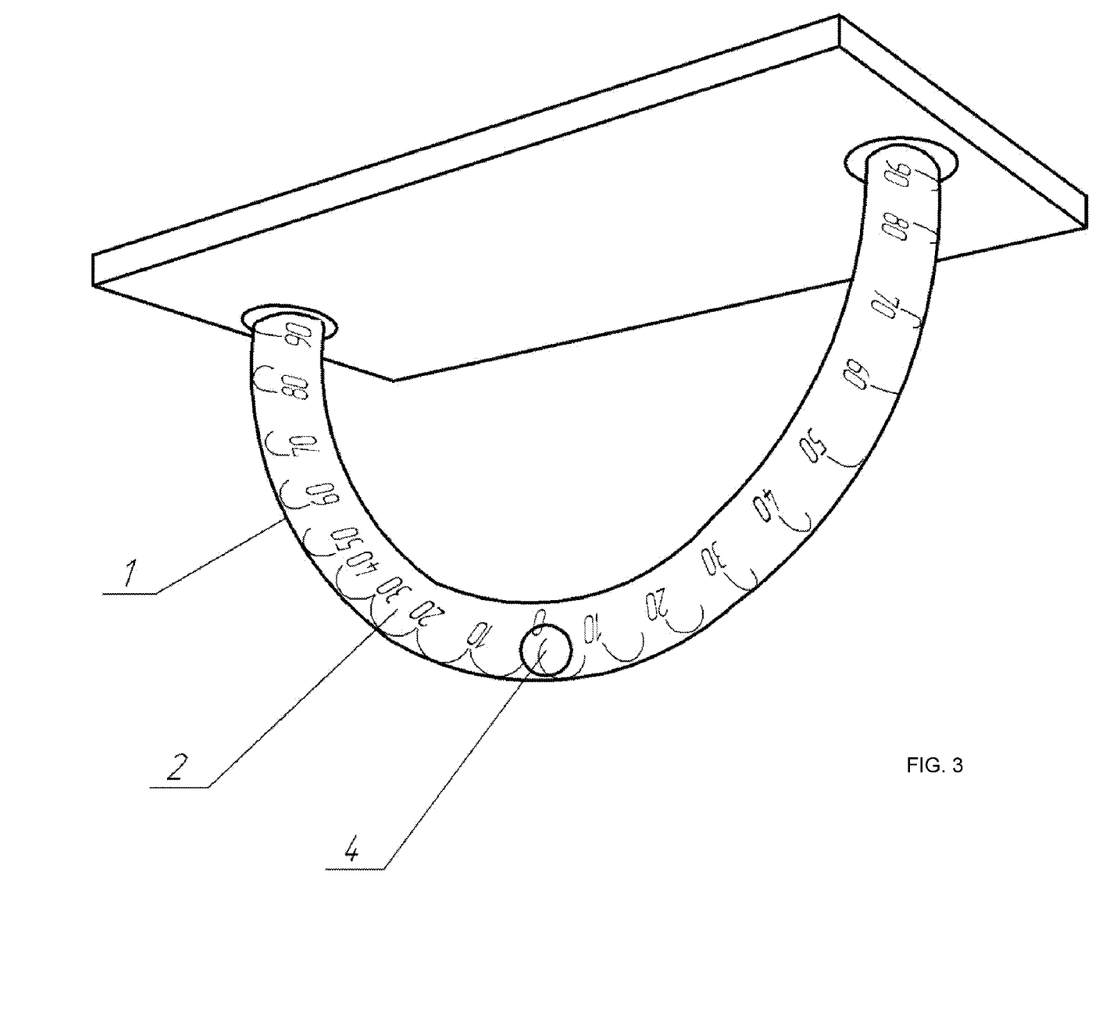

3. A liquid angle indicator, consisting of the base with a graduated glass tube attached to it, which contains liquid and an indicator, differing by having an open loop semicircular glass tube and its ends attached to the rectangular plate (base), while the indicator is designed as a ball made of material, which is denser than the liquid. (FIG. 3).

Figure 4:
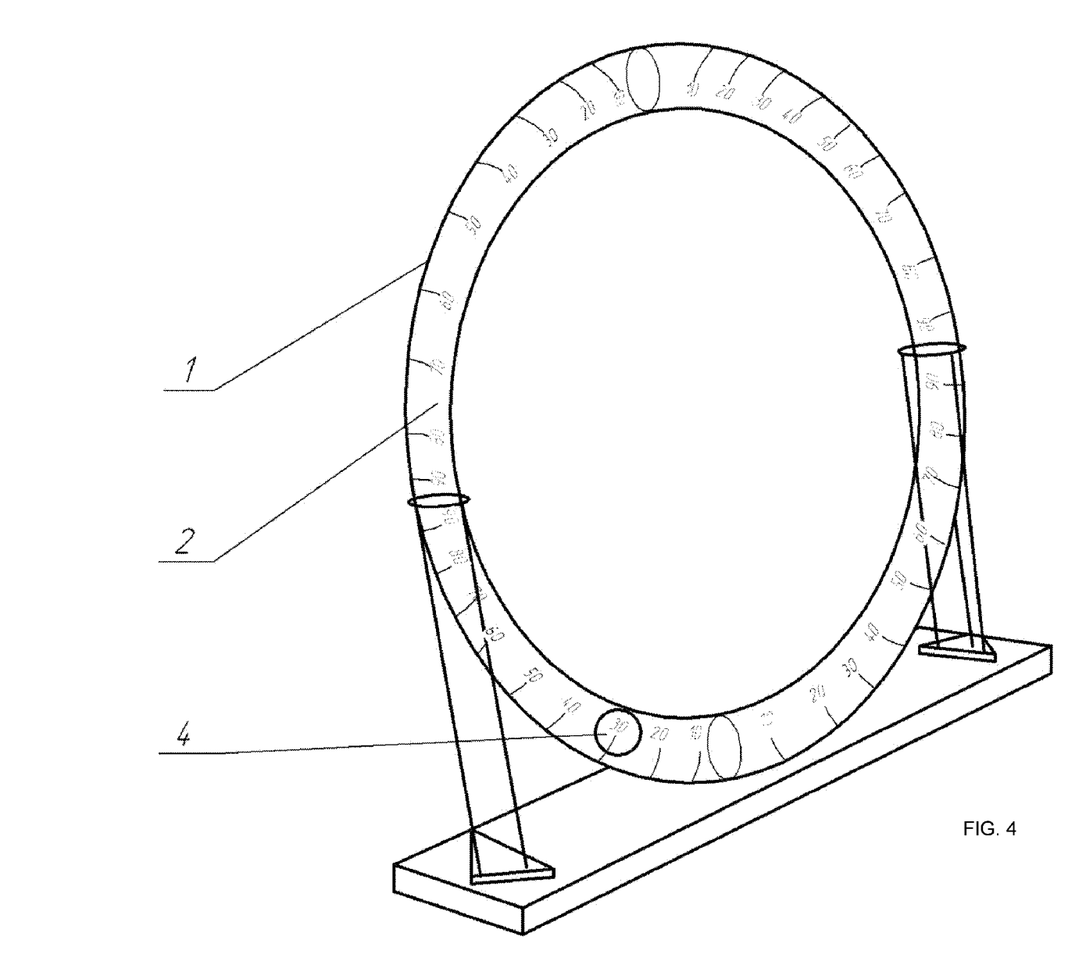

4. A liquid angle indicator, consisting of the base with a graduated glass tube attached to it, which contains liquid and an indicator, differing by having a closed loop round glass tube and it is fastened to the rectangular plate (base) at two ends by supports, which hold the tube in place, while the indicator is designed as a ball made of material, which is denser than the liquid. (FIG. 4).

Figure 5:
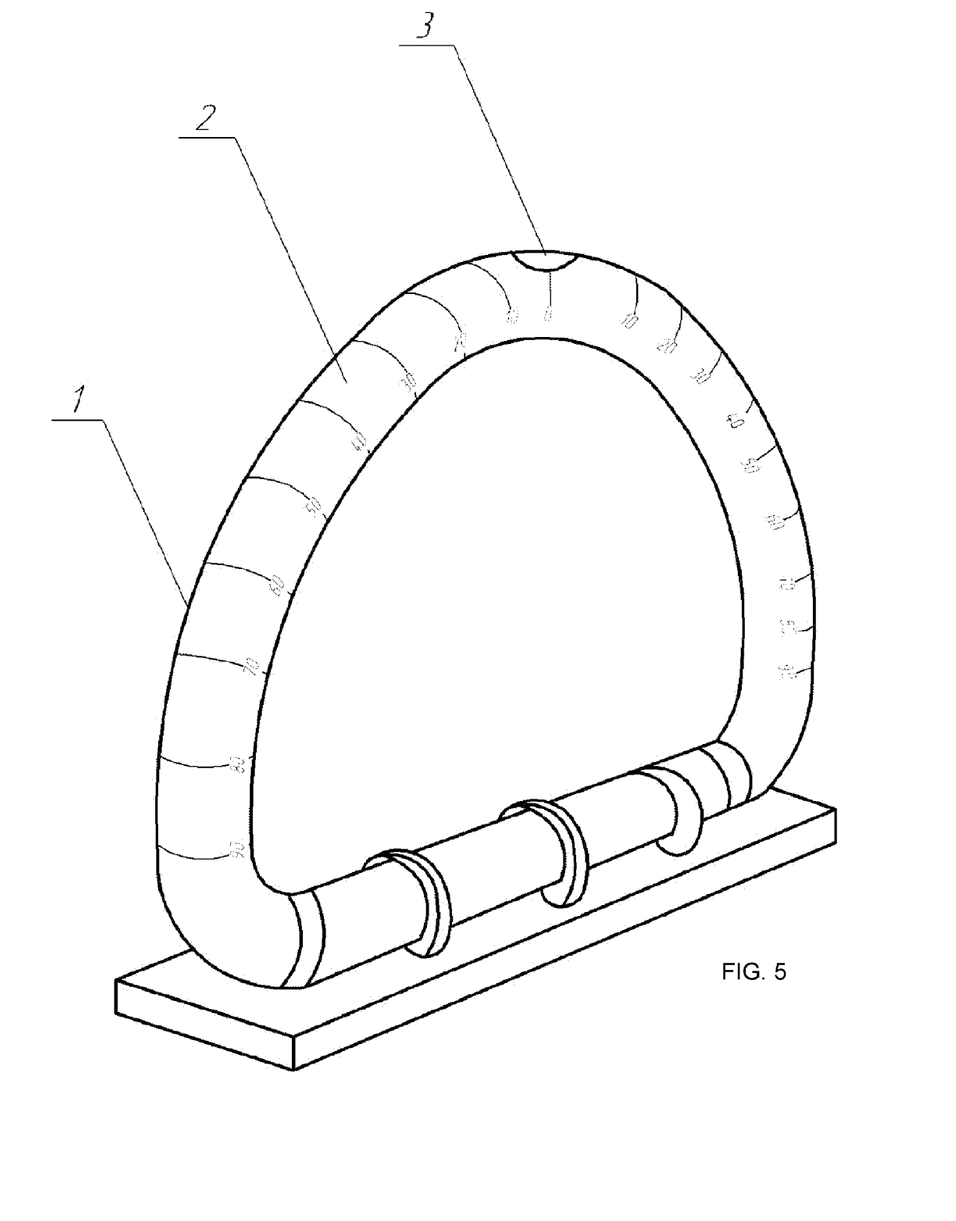

5. A liquid angle indicator, consisting of the base with a graduated glass tube attached to it, which contains liquid and an indicator, i.e. an air bubble, differing by having a closed loop semicircular glass tube, whose straight line part is attached to the rectangular plate (base). (FIG. 5).

Figure 6:
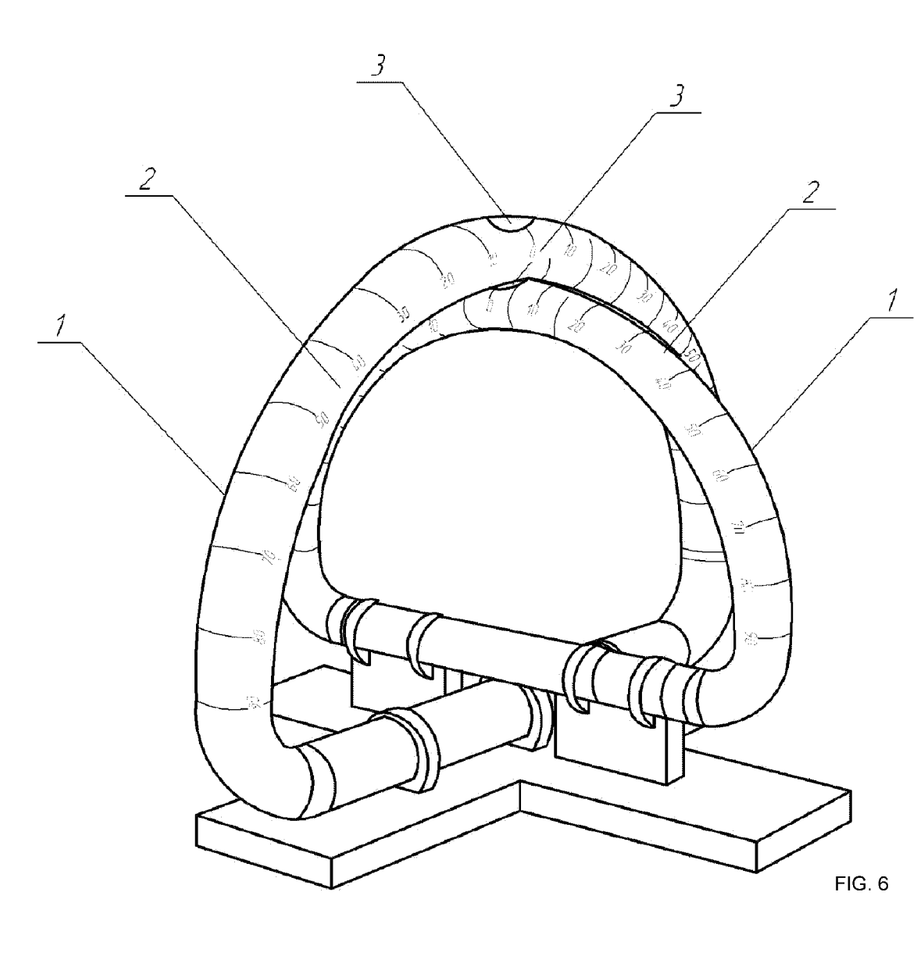

6. A liquid angle indicator, consisting of the base with a graduated glass tube attached to it, which contains liquid and an indicator, i.e. an air bubble, differing by having a second glass tube, where both closed loop semicircular glass tubes cross each other, forming an "X", while the inner glass tube's straight line part is fastened between two stands installed on one side of the X-shaped base. (FIG. 6).

7. A liquid angle indicator, consisting of the base with a graduated glass tube attached to it, which contains liquid and an indicator, i.e. an air bubble, differing by having a closed loop round glass tube and attached to the rectangular plate (base) by supports. (FIG. 7).

8. A liquid angle indicator, consisting of the base with a graduated glass tube attached to it, which contains liquid and an indicator, i.e. an air bubble, differing by having a second glass tube, where both closed loop round glass tubes cross each other and form an "X", while these tubes are attached to an X-shaped base by supports. (FIG. 8.).

* * * * *